(12) United States Patent
Wang et al.

(10) Patent No.: US 9,948,464 B1
(45) Date of Patent: Apr. 17, 2018

(54) MULTI-PORT PUF CIRCUIT BASED ON NMOS ZERO TEMPERATURE COEFFICIENT POINT

(71) Applicant: Ningbo University, Zhejiang (CN)

(72) Inventors: Pengjun Wang, Zhejiang (CN); Gang Li, Zhejiang (CN); Yuejun Zhang, Zhejiang (CN); Huihong Zhang, Zhejiang (CN)

(73) Assignee: Ningbo University, Zhejiang (CN)

( * ) Notice: Subject to any disclaimer, the term of this patent is extended or adjusted under 35 U.S.C. 154(b) by 0 days.

(21) Appl. No.: 15/682,560

(22) Filed: Aug. 22, 2017

(30) Foreign Application Priority Data

Jan. 5, 2017 (CN) .......................... 2017 1 0007792

(51) Int. Cl.
*H04L 9/32* (2006.01)
*G06F 21/73* (2013.01)
*H03K 19/177* (2006.01)

(52) U.S. Cl.
CPC ............... *H04L 9/32* (2013.01); *G06F 21/73* (2013.01); *H03K 19/17768* (2013.01)

(58) Field of Classification Search
None
See application file for complete search history.

(56) References Cited

U.S. PATENT DOCUMENTS

| 4,924,412 | A | * | 5/1990 | Leydier | ............... | G01R 21/133 |
| | | | | | | 324/142 |
| 4,926,131 | A | * | 5/1990 | Leydier | ............... | G01R 19/252 |
| | | | | | | 327/105 |
| 7,071,752 | B2 | * | 7/2006 | Kowkutla | ............. | H03F 3/2171 |
| | | | | | | 327/291 |
| 7,898,283 | B1 | * | 3/2011 | Koushanfar | ............ | G06F 21/72 |
| | | | | | | 326/47 |
| 8,419,274 | B2 | * | 4/2013 | Chen | ....................... | G01K 7/01 |
| | | | | | | 327/512 |
| 8,458,489 | B2 | * | 6/2013 | Beckmann | .............. | G06F 9/455 |
| | | | | | | 713/189 |
| 8,912,817 | B2 | * | 12/2014 | Wang | ............... | H03K 19/17756 |
| | | | | | | 326/38 |
| 9,501,664 | B1 | * | 11/2016 | Hamlet | .................... | G06F 21/71 |
| 9,584,329 | B1 | * | 2/2017 | Trimberger | ........... | H04L 9/3278 |
| 9,628,272 | B2 | * | 4/2017 | Rostami | ................ | H04L 9/0866 |

(Continued)

*Primary Examiner* — Crystal L Hammond
(74) *Attorney, Agent, or Firm* — JCIPRNET (57) ABSTRACT

The present invention discloses a multi-port PUF circuit based on NMOS zero temperature coefficient point, comprising an input register, a deviation current source, a arbiter and a disturbing module used to construct a multi-port PUF circuit; the input register comprises m D-flip-flops; the deviation current module comprises m deviation current cells; the arbiter comprises 2n current sensitive amplifiers; the disturbing module comprises n 2-input XOR gates; wherein an input challenge used to configure deviation current generation module can update IDs without replacement of hardware. In addition, it has a capability of producing a multi-bit IDs in one clock cycle. Post-layout simulation results show that the PUF circuit is provided with excellent uniqueness and randomness with reliability up to 98.2% across temperature variation from −40° C. to 125° C., and supply voltage variation from 1.08V to 1.32V; it can be applied in information security field.

3 Claims, 6 Drawing Sheets

(56) References Cited

U.S. PATENT DOCUMENTS

| | | | | |
|---|---|---|---|---|
| 9,722,805 B2* | 8/2017 | Suzuki | ............... | H04L 9/3278 |
| 9,806,718 B2* | 10/2017 | Wallrabenstein | ..... | H04L 9/0866 |
| 2009/0083833 A1* | 3/2009 | Ziola | ............... | G06F 21/31 |
| | | | | 726/2 |
| 2015/0195088 A1* | 7/2015 | Rostami | ............... | G09C 1/00 |
| | | | | 380/28 |
| 2016/0269186 A1* | 9/2016 | Wallrabenstein | ....... | G06F 21/31 |
| 2017/0077046 A1* | 3/2017 | Gupta | ............... | H01L 23/576 |

* cited by examiner

MULTI-PORT PUF CIRCUIT BASED ON NMOS ZERO TEMPERATURE COEFFICIENT POINT

CROSS-REFERENCE TO RELATED APPLICATION

This application claims the priority benefit of China application no. 201710007792.9, filed on Jan. 5, 2017. The entirety of the above-mentioned patent application is hereby incorporated by reference herein and made a part of this specification.

FIELD OF THE INVENTION

The present invention is related to a multi-port Physical Unclonable Function (PUF) circuit, in particular to a multi-port PUF circuit based on NMOS zero temperature coefficient point.

BACKGROUND ART

Accompanied by accelerated development of computer and integrated circuit technologies, information security and privacy are attracting increasing attentions. Physical Unclonable Function (PUF) circuit provides an approach for enhancement of information security by extracting texture features of hardware. Such technology serves as "DNA Feature Identification Technology" in the field of integrated circuit. Silicon based PUF circuit is one of major research focuses of PUF circuit, which makes use of slight process deviation (represented by varied time delay, current and voltage) to unit circuits with the same structural and designing parameters to produce a large number of identifications (IDs) based on corresponding contrast mechanism. Those IDs have features of unclonability, randomness and uniqueness. The deviations can fall into two categories: The first one is deviation to process parameters as incurred by deposition and uneven diffusion of doping agent, including doping concentration, oxidation thickness, diffusion depth and so on; the second one is deviation to geometrical scale as determined by photolithography precision, including deviation to width and length of transistor. PUF circuit has extensive application in such information security fields as device authentication, secure key generation and IP protection.

As PUF circuit is designed based on minor deviation to process parameters during manufacturing of IC, circuit function is vulnerable to impact from such factors as supply voltage, temperature and ageing. Reliability refers to a property that ensures normal operation of PUF circuit under the impact from various factors, which serves as one of important performance indicators for PUF circuit. Reliability of PUF circuit has tremendous impact on safety of the system which embedded PUF circuit; therefore, highly reliable PUF circuit has become a focus of current studies and designs.

Thus, it is of vital importance to design a high-reliability multi-port PUF circuit based on NMOS zero temperature coefficient point, featuring in high uniqueness and randomness.

SUMMARY OF THE INVENTION

The technical issue to be settled by the present invention is to provide a high-reliability multi-port Physical Unclonable Function (PUF) circuit based on NMOS zero temperature coefficient point, featuring in high uniqueness and randomness.

A technical solution used by the present invention to settle aforesaid technical issue is stated as follows: A multi-port PUF circuit based on NMOS zero temperature coefficient point, comprising an input register, a deviation current source, an arbiter and a disturbing module; the said input register comprise m D-flip-flops; the said D-flip-flop is provided with an input terminal, an output terminal and a clock terminal, m≥1; clock terminals of m D-flip-flops are connected, and the connecting terminal is the clock terminal of the said input register; output terminals of m D-flip-flops constitute m output terminals of the said input register; the said deviation current source comprises 2n deviation current modules; the said deviation current module comprises m deviation current cells; the said deviation current cell is provided with an input terminal, a zero temperature coefficient control terminal, the $1^{st}$ and $2^{nd}$ output terminals, n≥2; input terminals of m deviation current cells constitute m output terminals of the said deviation current module; zero temperature coefficient control terminals of m deviation current cells are connected, and the connecting terminal is the zero temperature control terminal of the said deviation current module; the $1^{st}$ output terminals of m deviation current cells are connected, and the connecting terminal is the $1^{st}$ output terminal of the said deviation current module; the $2^{nd}$ output terminals of m deviation current cells are connected, and the connecting terminal is the $2^{nd}$ output terminal of the said deviation current module; the said arbiter comprises 2n current sensitive amplifiers; the said current sensitive amplifier is provided with an enabling terminal, a trigger terminal, a $1^{st}$ input terminal, a $2^{nd}$ input terminal and output terminal; the said disturbing module comprises n two-input XOR gate; the said two-input XOR gate is provided with a $1^{st}$ input terminal, a $2^{nd}$ input terminal and output terminal; m output terminals of the said input register are in corresponding connection with m input terminals of 2n deviation current module; the $1^{st}$ output terminal of j deviation current modules is connected to the $1^{st}$ input terminal of current sensitive amplifier j; the $2^{nd}$ output terminal of deviation current module j is connected to the $2^{nd}$ input terminal of current sensitive amplifier j, j=1, 2, . . . , 2n; output terminal of the said current sensitive amplifier k is connected to the $1^{st}$ input terminal of the two-input XOR gate k; output terminal of the current sensitive amplifier n+k is connected to the $2^{nd}$ input terminal of the two-input XOR gate k, k=1, 2, . . . , n.

The said deviation current cell comprises the $1^{st}$ PMOS, the $2^{nd}$ PMOS, the $1^{st}$ NMOS and $2^{nd}$ NMOS; grid of the $1^{st}$ PMOS is connected to the grid of the $2^{nd}$ PMOS, and the connecting terminal is the input terminal of the said deviation current cell; drain of the $1^{st}$ PMOS is connected to the drain of the $1^{st}$ NMOS; drain of the $2^{nd}$ PMOS is connected to the drain of the $2^{nd}$ NMOS; grid of the $1^{st}$ NMOS is connected to the grid of the $2^{nd}$ NMOS, and the connecting terminal is the zero temperature coefficient control terminal of the said deviation current cell; sources of the $1^{st}$ and $2^{nd}$ NMOSs are grounded; source of the $1^{st}$ PMOS is the $1^{st}$ output terminal of the said deviation current cell; source of the $2^{nd}$ PMSO is the $2^{nd}$ output terminal of the said deviation current cell.

The said current sensitive amplifier comprises the $3^{rd}$ PMOS, the $4^{th}$ PMOS, the $5^{th}$ PMOS, the $6^{th}$ PMOS, the $7^{th}$ PMOS, the $3^{rd}$ NMOS, the $4^{th}$ NMOS, the 1-2 input NAND gate and the 2-2 input NAND gate; the 1-2 input NAND gate and the 2-2 input NAND gate are provided with the $1^{st}$ input terminal, the $2^{nd}$ input terminal and output terminal respectively; grid of the $3^{rd}$ PMOS is connected to the grid of the $6^{th}$ PMOS, and the connecting terminal is the trigger terminal of the said current sensitive amplifier; source of the $3^{rd}$ PMOS, the $4^{th}$ PMOS, the $5^{th}$ PMOS and the $6^{th}$ PMOS is connected to the drain of the $7^{th}$ PMOS; grid of the $7^{th}$ PMOS is the enabling terminal of the said current sensitive amplifier; source of the $7^{th}$ PMOS is connected to the power source; drain of the $3^{rd}$ PMOS, drain of the $4^{th}$ PMOS, grid of the $5^{th}$ PMOS, drain of the $3^{rd}$ NMOS and grid of the $4^{th}$ NMOS are connected to the $1^{st}$ input terminal of the said 1-2 input NAND gate; drain of the $5^{th}$ PMOS, drain of the $6^{th}$ PMOS, grid of the $4^{th}$ PMOS, drain of the $4^{th}$ NMOS and grid of the $3^{rd}$ NMOS are connected to the $2^{nd}$ input terminal of the said 2-2 input NAND gate; source of the $3^{rd}$ NMOS is the $1^{st}$ input terminal of the said current sensitive amplifier; source of the $4^{th}$ NMOS is the $2^{nd}$ input terminal of the said current sensitive amplifier; the $2^{nd}$ input terminal of the 1-2 input NAND gate is connected to the output terminal of the 2-2 input NAND gate; the $1^{st}$ input terminal of the said 2-2 input NAND gate is connected to the output terminal of the 1-2 input NAND gate, and the connecting terminal is the output terminal of the said current sensitive amplifier.

As compared with prior arts, the present invention is characterized in that the multi-port PUF circuit is constituted by input register, deviation current source, arbiter and disturbing module; the said input register comprises m D-flip-flops; the said D-flip-flop is provided with an input terminal, an output terminal and a clock terminal, m≥1; clock terminals of m D-flip-flops are connected, and the connecting terminal is the clock terminal of the said input register; output terminals of m D-flip-flops constitute in output terminals of the said input register; the said deviation current source comprises 2n deviation current modules; the said deviation current module comprises m deviation current cells; the said deviation current cell is provided with an input terminal, a zero temperature coefficient control terminal, the $1^{st}$ and $2^{nd}$ output terminals, n≥2; input terminals of m deviation current cells constitute m output terminals of he said deviation current module; zero temperature coefficient control terminals of m deviation current cells are connected, and the connecting terminal is the zero temperature control terminal of the said deviation current module; the $1^{st}$ output terminals of m deviation current cells are connected, and the connecting terminal is the 1st output terminal of the said deviation current module; the $2^{nd}$ output terminals of m deviation current cells are connected, and the connecting terminal is the $2^{nd}$ output terminal of the said deviation current module; the said arbiter comprises 2n current sensitive amplifiers; the said current sensitive amplifier is provided with an enabling terminal, a trigger terminal, a $1^{st}$ input terminal, a $2^{nd}$ input terminal and output terminal; the said disturbing module comprises n two-input XOR gate; the said two-input XOR gate is provided with a $1^{st}$ input terminal, a $2^{nd}$ input terminal and output terminal; in output terminals of the said input register are in corresponding connection with m input terminals of 2n deviation current module; the 1st output terminal of j deviation current modules is connected to the $1^{st}$ input terminal of current sensitive amplifier j; the $2^{nd}$ output terminal of deviation current module j is connected to the $2^{nd}$ input terminal of current sensitive amplifier j, j=1, 2, . . . , 2n; output terminal of the said current sensitive amplifier k is connected to the $1^{st}$ input terminal of the two-input XOR gate k; output terminal of the current sensitive amplifier n+k is connected to the $2^{nd}$ input terminal of the two-input XOR gate k, k=1, 2, . . . , n; when challenge signal is used to configure deviation current generation module, output cipher variation can be realized without replacement of hardware, which is available for output of multi IDs within a clock cycle; according to TSMC-LP 65 nm CMOS process, a PUF circuit with 64 output ports can be designed in full customization mode; the domain area is 131 μm×242 μm, as indicated by experiment results, such PUF circuit is provided with excellent uniqueness and randomness with reliability up to 98.2% under different temperature (−40° C.~125° C.) and voltage (1.08V~1.32V); it can be applied to information security field.

DESCRIPTION EMBODIMENTS

The present invention is further described in detail as follows in combination with drawings and embodiments.

Embodiment 1

Figure 1:
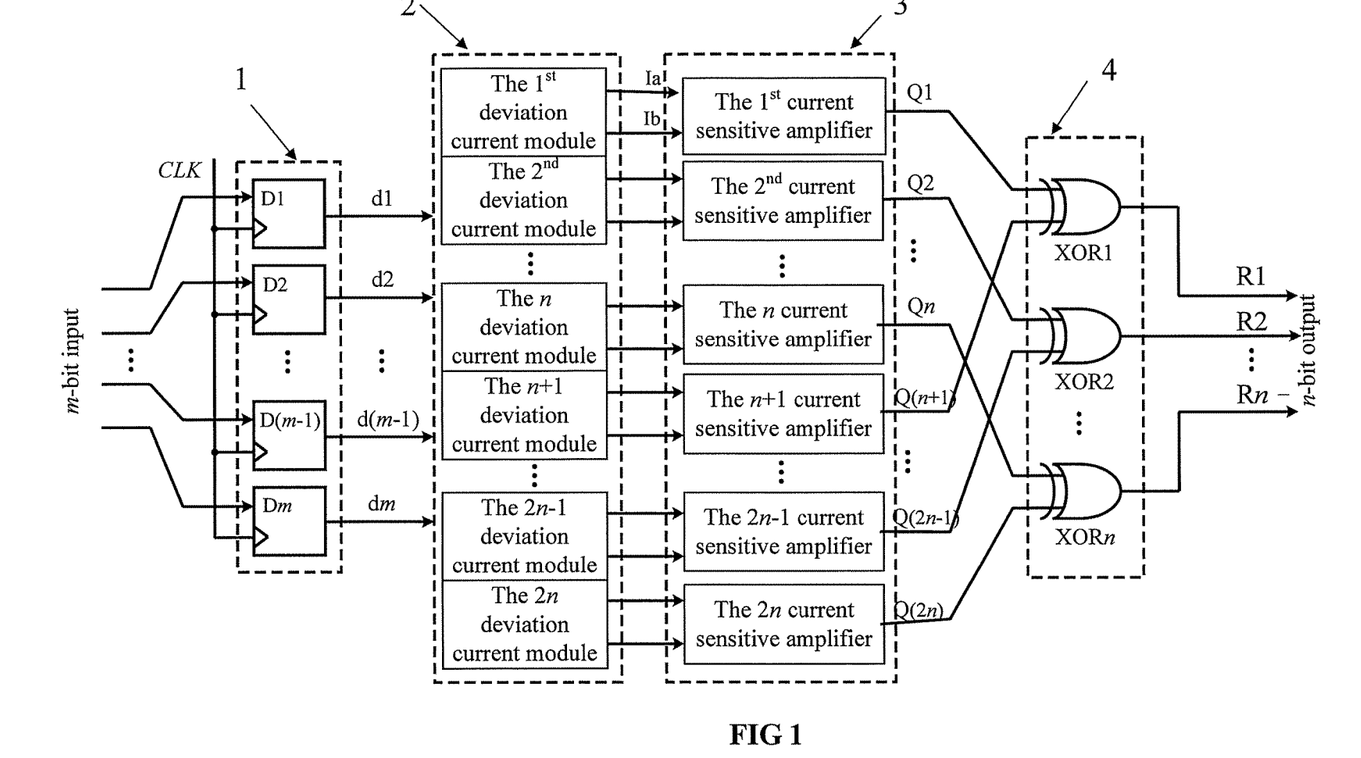
FIG. 1 is the structural diagram for a multi-port PUF circuit based on NMOS zero temperature coefficient point according to the present invention.

A multi-port Physical Unclonable Function (PUF) circuit based on NMOS zero temperature coefficient point as shown in FIG. 1, comprising an input register 1, a deviation current source 2, a arbiter 3 and a disturbing module 4; input register 1 comprise m D-flip-flops; D-flip-flop 2 is provided with an input terminal, an output terminal and a clock terminal; clock terminals of m D-flip-flops are connected, and the connecting terminal is the clock terminal of input register 1; output terminals of m D-flip-flops constitute m output terminals of input register 1; deviation current source 2 comprises 2n deviation current modules; deviation current module 2 comprises m deviation current cells; the said deviation current cell is provided with an input terminal, a zero temperature coefficient control terminal, the $1^{st}$ and $2^{nd}$ output terminals, n≥2; input terminals of m deviation current cells constitute m output terminals of he said deviation current module; zero temperature coefficient control terminals of m deviation current cells are connected, and the connecting terminal is the zero temperature control terminal of the said deviation current module; the 1$^{st}$ output terminals of m deviation current cells are connected, and the connecting terminal is the 1$^{st}$ output terminal of the said deviation current module; the 2$^{nd}$ output terminals of m deviation current cells are connected, and the connecting terminal is the 2$^{nd}$ output terminal of the said deviation current module; arbiter 3 comprises 2n current sensitive amplifiers; the said current sensitive amplifier is provided with an enabling terminal, a trigger terminal, a 1$^{st}$ input terminal, a 2$^{nd}$ input terminal and output terminal; disturbing module 4 comprises n two-input XOR gate; the said two-input XOR gate is provided with a 1$^{st}$ input terminal, a 2$^{nd}$ input terminal and output terminal; m output terminals of input register 1 are in corresponding connection with m input terminals of 2n deviation current module; the 1$^{st}$ output terminal of j deviation current modules is connected to the 1$^{st}$ input terminal of current sensitive amplifier j; the 2$^{nd}$ output terminal of deviation current module j is connected to the 2$^{nd}$ input terminal of current sensitive amplifier j, j=1, 2, . . . , 2n; output terminal of the said current sensitive amplifier k is connected to the 1$^{st}$ input terminal of the two-input XOR gate k; output terminal of the current sensitive amplifier n+k is connected to the 2$^{nd}$ input terminal of the two-input XOR gate k, k=1, 2, . . . , n.

Embodiment 2

A multi-port PUF circuit based on NMOS zero temperature coefficient point as shown in FIG. 1, comprising an input register 1, a deviation current source 2, a arbiter 3 and a disturbing module 4; input register 1 comprise m D-flip-flops; D-flip-flop is provided with an input terminal, an output terminal and a clock terminal; clock terminals of m D-flip-flops are connected, and the connecting terminal is the clock terminal of input register 1; output terminals of m D-flip-flops constitute m output terminals of input register 1; deviation current source 2 comprises 2n deviation current modules; deviation current module 2 comprises m deviation current cells; the said deviation current cell is provided with an input terminal, a zero temperature coefficient control terminal, the 1$^{st}$ and 2$^{nd}$ output terminals, n≥2; input terminals of m deviation current cells constitute m output terminals of he said deviation current module; zero temperature coefficient control terminals of m deviation current cells are connected, and the connecting terminal is the zero temperature control terminal of the said deviation current module; the 1$^{st}$ output terminals of m deviation current cells are connected, and the connecting terminal is the 1$^{st}$ output terminal of the said deviation current module; the 2$^{nd}$ output terminals of m deviation current cells are connected, and the connecting terminal is the 2$^{nd}$ output terminal of the said deviation current module; arbiter 3 comprises 2n current sensitive amplifiers; the said current sensitive amplifier is provided with an enabling terminal, a trigger terminal, a 1$^{st}$ input terminal, a 2$^{nd}$ input terminal and output terminal; disturbing module 4 comprises n two-input XOR gate; the said two-input XOR gate is provided with a 1$^{st}$ input terminal, a 2$^{nd}$ input terminal and output terminal; m output terminals of input register 1 are in corresponding connection with m input terminals of 2n deviation current module; the 1$^{st}$ output terminal of j deviation current module is connected to the 1$^{st}$ input terminal of current sensitive amplifier j; the 2$^{nd}$ output terminal of deviation current module j is connected to the 2$^{nd}$ input terminal of current sensitive amplifier j, j=1, 2, . . . , 2n; output terminal of the said current sensitive amplifier k is connected to the 1$^{st}$ input terminal of the two-input XOR gate k; output terminal of the current sensitive amplifier n+k is connected to the 2$^{nd}$ input terminal of the two-input XOR gate k, k=1, 2, . . . , n.

Figure 2:
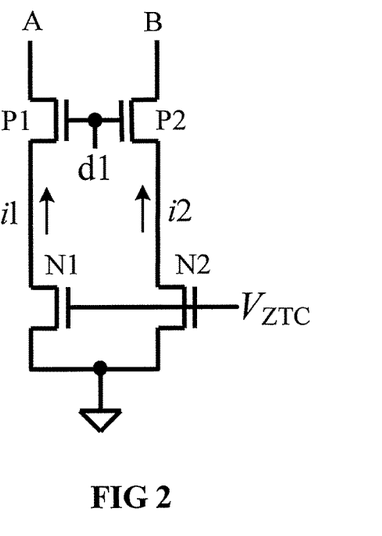
FIG. 2 is the circuit diagram for the deviation current cell of the present invention.

As shown in FIG. 2, in this embodiment, the said deviation current cell comprises the 1$^{st}$ PMOS P1, the 2$^{nd}$ PMOS P2, the 1$^{st}$ NMOS N1 and 2$^{nd}$ NMOS N2; grid of the 1$^{st}$ PMOS P1 is connected to the grid of the 2$^{nd}$ PMOS P2, and the connecting terminal is the input terminal of the said deviation current cell; drain of the 1$^{st}$ PMOS P1 is connected to the drain of the 1$^{st}$ NMOS N1; drain of the 2$^{nd}$ PMOS P2 is connected to the drain of the 2$^{nd}$ NMOS N2; grid of the 1$^{st}$ NMOS N1 is connected to the grid of the 2$^{nd}$ NMOS N2, and the connecting terminal is the zero temperature coefficient control terminal of the said deviation current cell; sources of the 1$^{st}$ NMOS N1 and 2$^{nd}$ NMOS N2 are grounded; source of the 1$^{st}$ PMOS P1 is the 1$^{st}$ output terminal of the said deviation current cell; source of the 2$^{nd}$ PMSO P2 is the 2$^{nd}$ output terminal of the said deviation current cell.

Figure 3:
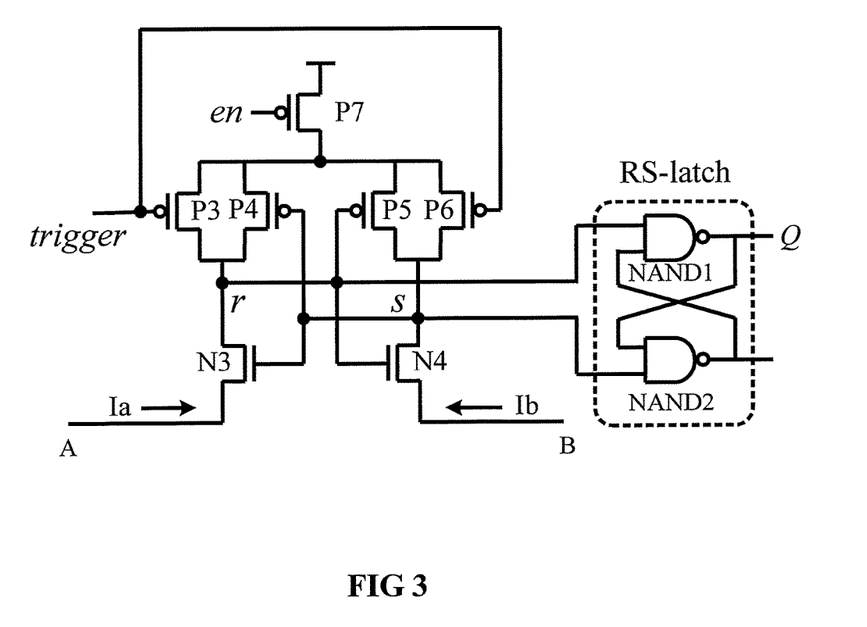
FIG. 3 is the circuit diagram for the current sensitive amplifier of the present invention.

As shown in FIG. 3, The said current sensitive amplifier in this embodiment comprises the 3$^{rd}$ PMOS P3, the 4$^{th}$ PMOS P4, the 5$^{th}$ PMOS P5, the 6$^{th}$ PMOS P6, the 7$^{th}$ PMOS P7, the 3$^{rd}$ NMOS N3, the 4$^{th}$ NMOS N4, the 1-2 input NAND gate NAND1 and the 2-2 input NAND gate NAND2; the 1-2 input NAND gate NAND1 and the 2-2 input NAND gate NAND2 are provided with the 1$^{st}$ input terminal, the 2$^{nd}$ input terminal and output terminal respectively; grid of the 3$^{rd}$ PMOS P3 is connected to the grid of the 6$^{th}$ PMOS P6, and the connecting terminal is the trigger terminal of the said current sensitive amplifier; source of the 3$^{rd}$ PMOS P3, the 4$^{th}$ PMOS P4, the 5$^{th}$ PMOS P5 and the 6$^{th}$ PMOS P6 is connected to the drain of the 7$^{th}$ PMOS P7; grid of the 7$^{th}$ PMOS P7 is the enabling terminal of the said current sensitive amplifier; source of the 7$^{th}$ PMOS P7 is connected to the power source; drain of the 3$^{rd}$ PMOS P3, drain of the 4$^{th}$ PMOS P4, grid of the 5$^{th}$ PMOS P5, drain of the 3$^{rd}$ NMOS N3 and grid of the 4$^{th}$ NMOS N4 are connected to the 1$^{st}$ input terminal of the said 1-2 input NAND gate NAND1; drain of the 5$^{th}$ PMOS P5, drain of the 6$^{th}$ PMOS P6, grid of the 4$^{th}$ PMOS P4, drain of the 4$^{th}$ NMOS N4 and grid of the 3$^{rd}$ NMOS N3 are connected to the 2$^{nd}$ input terminal of the said 2-2 input NAND gate NAND2; source of the 3$^{rd}$ NMOS N3 is the 1$^{st}$ input terminal of the said current sensitive amplifier; source of the 4$^{th}$ NMOS N4 is the 2$^{nd}$ input terminal of the said current sensitive amplifier; the 2$^{nd}$ input terminal of the 1-2 input NAND gate NAND1 is connected to the output terminal of the 2-2 input NAND gate NAND2; the 1$^{st}$ input terminal of the said 2-2 input NAND gate NAND2 is connected to the output terminal of the 1-2 input NAND gate NAND1, and the connecting terminal is the output terminal of the said current sensitive amplifier.

Figure 4:
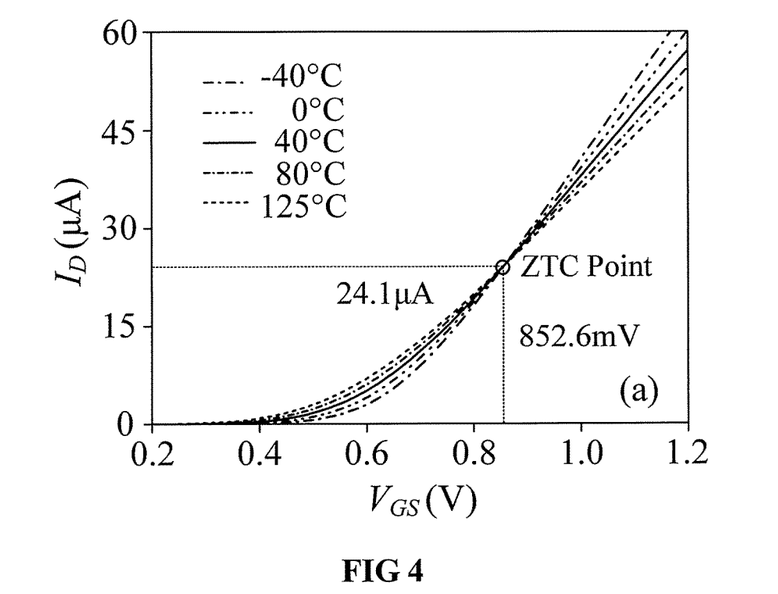
FIG. 4 shows the I-V curve of NMOS versus temperature. The NMOS use the minimum size of TSMC-LP 65 nm (W/L=120 nm/60 nm)
Figure 5:
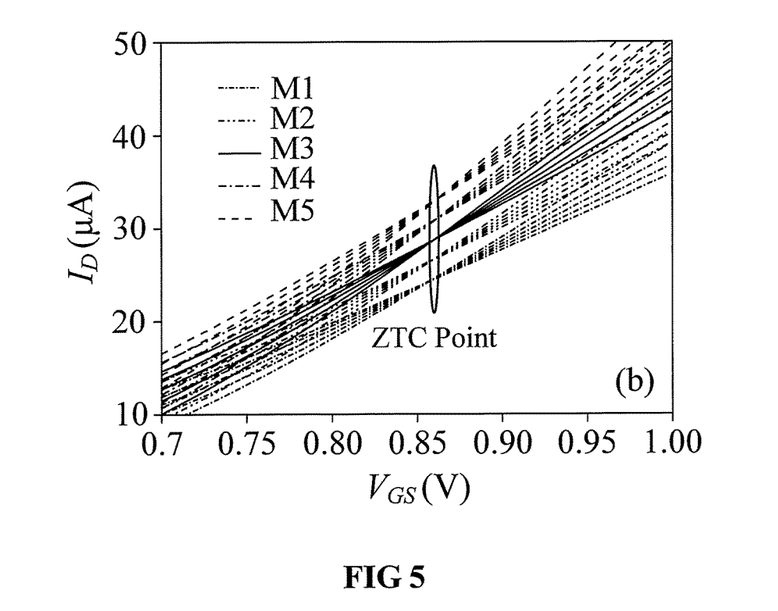
FIG. 5 shows I-V property curves of five mismatched NMOS.

FIG. 4 shows the I-V curve of NMOS versus temperature. The NMOS use the minimum size of TSMC-LP 65 nm (W/L=120 nm/60 nm). As shown in FIG. 4, drain current ($I_D$) of NMOS may vary as temperature changes under the same gate-source voltage ($V_{GS}$), indicating that temperature may affect the drain current of NMOS; meanwhile, it is also discovered that I-V curve for varied temperature are intersected at a point; this point is known as ZTC point (zero temperature coefficient point) of NMOS, of which coordinate is (852 mV, 23.5 μA). At this point, $I_D$ of NMOS will remain constant in case of temperature variation; therefore, NMOS working at the zero temperature coefficient point is provided with higher robustness. FIG. 5 shows I-V property curve for mismatched parameters of NMOS; M1, M2, M3, M4 and M5 refer to NMOS with different mismatch parameters. It can be discovered through analysis of FIG. 5 that NMOS is provided with different ZTC points under different mismatch parameters; it is also discovered that $V_G$s of different ZTC points is almost identical. In other words, NMOS is provided with different drain current; however, it is not affected by temperature variation, which can satisfy the second condition for improvement of reliability of PUF circuit (enhance robustness of deviation signals to be compared to non-process parameters). Therefore, it is applicable to make use of the ZTC point of NMOS to construct high reliable PUF circuit.

Uniqueness, randomness and reliability of the present invention are verified as follows through post-layout simulation.

Figure 6:
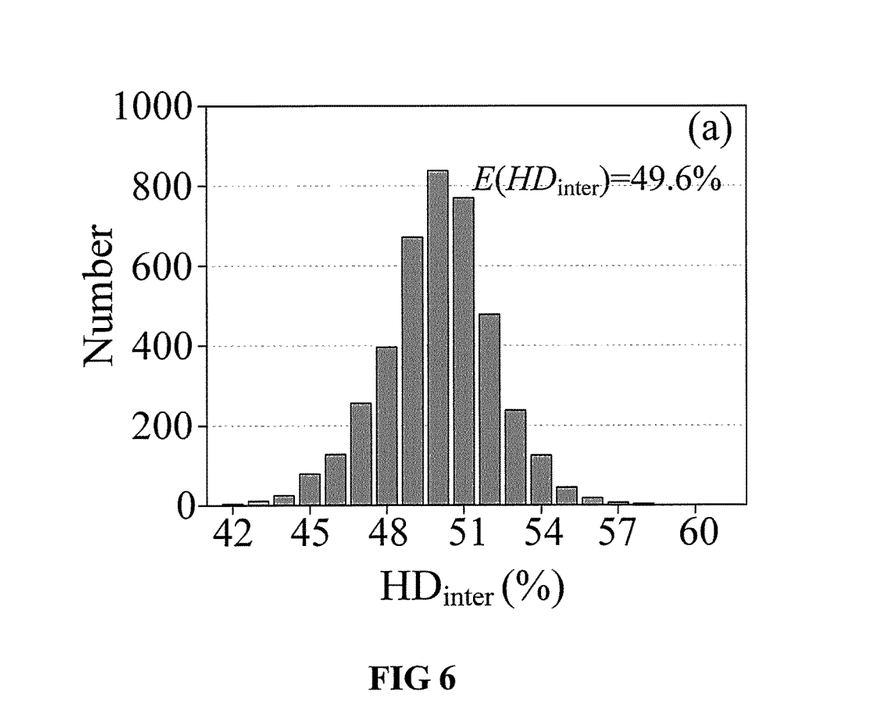
FIG. 6 is the $HD_{inter}$ statistical diagram of the present invention under 4096 different challenges.
Figure 7:
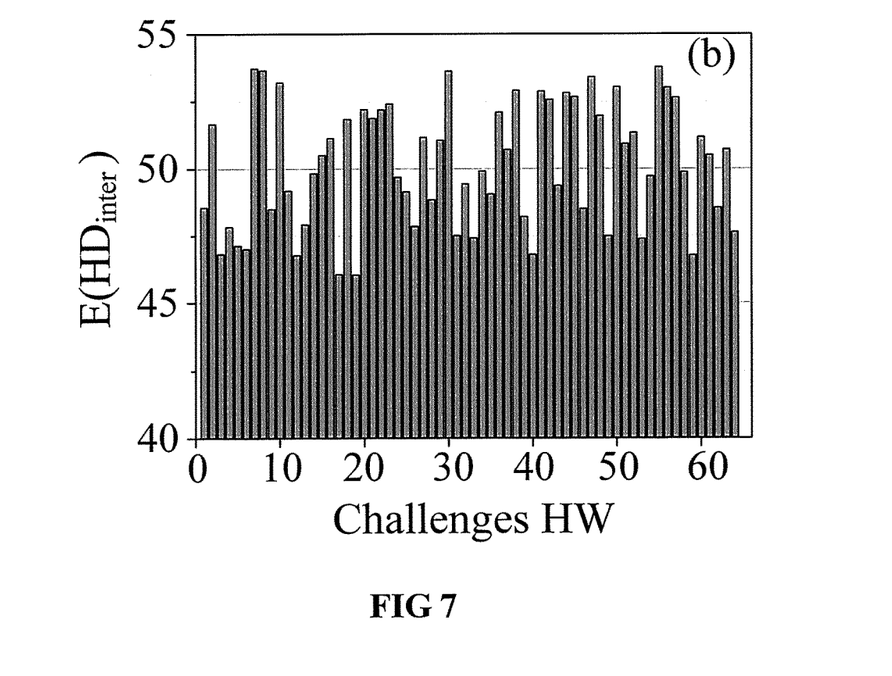
FIG. 7 shows interrelation between $E(HD_{inter})$ and challenge HW of the present invention.

Uniqueness is the one that refers to the ability of a PUF circuit to produce independent IDs for the same design across various instances. Normally, it is judged through by calculating Hamming Distance (HD) of output response of different PUF instances of the same structure. As the challenge length of the PUF circuit is 64-bit, the valid Hamming Weight (HW) of the challenge is in the range of 1 to 64. To ensure accurate experiment results, altogether 4096 (64×64) groups of different challenge are extracted, namely random selection of 64 groups of challenges per HW (non-repetitive). 10000 times Monte Carlo simulations (k=10000) of extracted PUF circuit is executed for under the same group of challenge to obtain 10000 output responses with length up to 64-bit (N=64); further calculate $HD_{inter}$ to obtain the statistical diagram as shown in FIG. 6 for 4096 groups of $HD_{inter}$ of the PUF circuit according to the present invention under different challenge. According to analysis of FIG. 6, $E(HD_{inter})$ of the present invention as calculated is 49.6%, extremely approximate to the ideal value (50%). FIG. 7 shows interrelation between $E(HD_{inter})$ of the present invention and challenge HW. As indicated by FIG. 7, $E(HD_{inter})$ fluctuates around 50% under different challenge HW.

Figure 8:
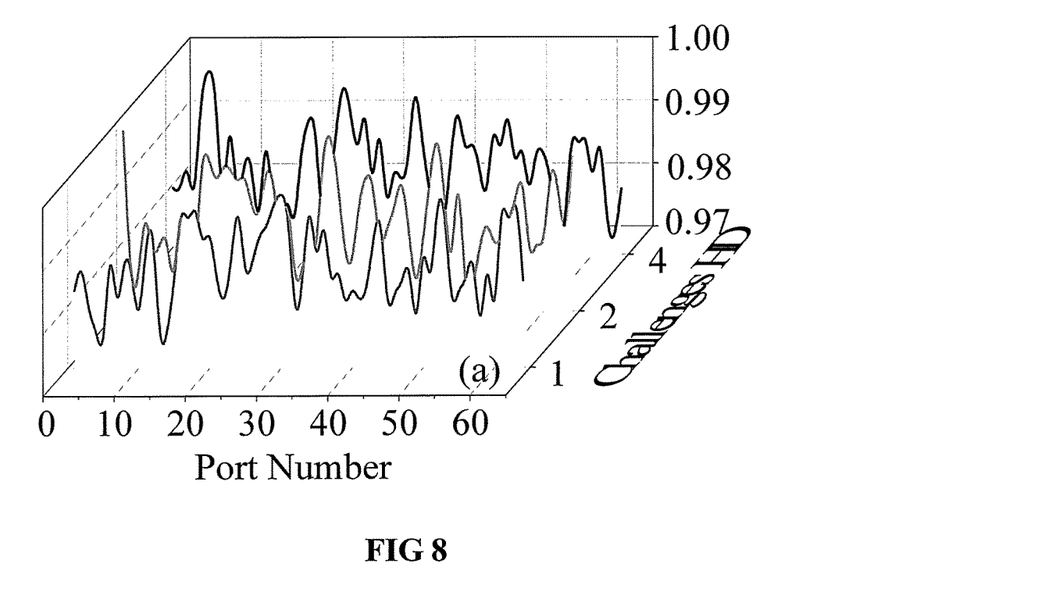
FIG. 8 shows the fitting curves for port information entropy of the present invention as increased with challenge HW of 1-2-4.
Figure 9:
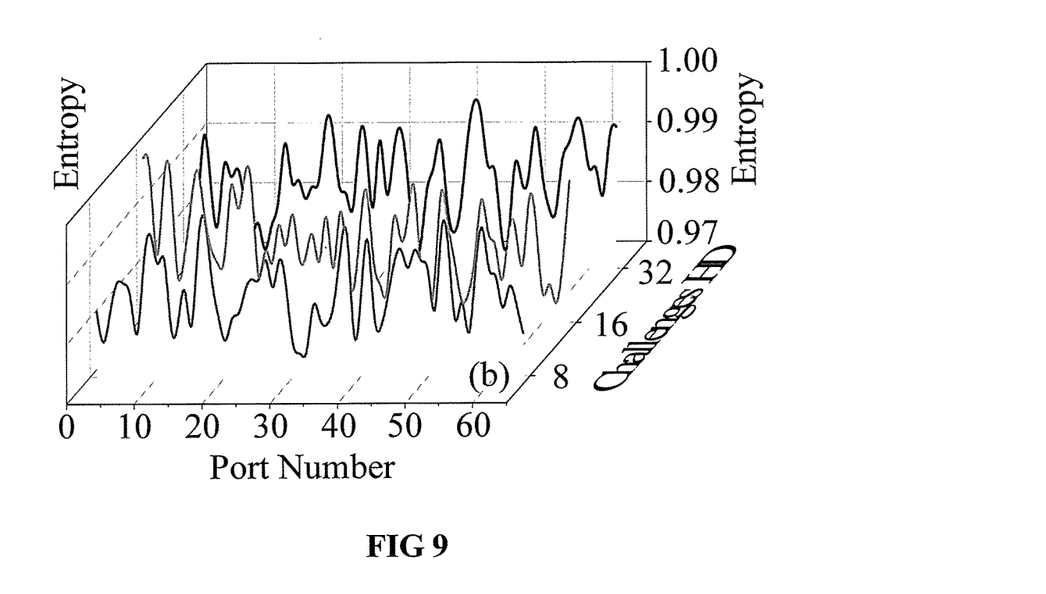
FIG. 9 shows the fitting curves for port information entropy of the present invention as increased with challenge HW of 8-16-32.

Information entropy can be used for quantitative analysis of randomness (chaos) of the information source. Presently, it is applicable to use information entropy to evaluate randomness of PUF output response for further evaluation of safety of PUF circuit. To ensure accurate testing of information entropy for output response of each PUF port, 6 types of HW are selected for gradual increase of challenge (1, 2, 4, 8, 16 and 32); 64 groups challenge per HW (non-repetitive) are selected for 10000 times Monte Carlo simulation under each group of challenge so as to calculate probability of logic level 0 and 1 of output data from each port as well as information entropy. Fitting curve for information entropy of each port as changed with challenge HW is as shown in FIGS. 8 and 9. According to analysis of FIGS. 8 and 9, information entropy of each port under different challenge HW is over 0.97; therefore, output data of such PUF circuit is provided with high randomness.

Figure 10:
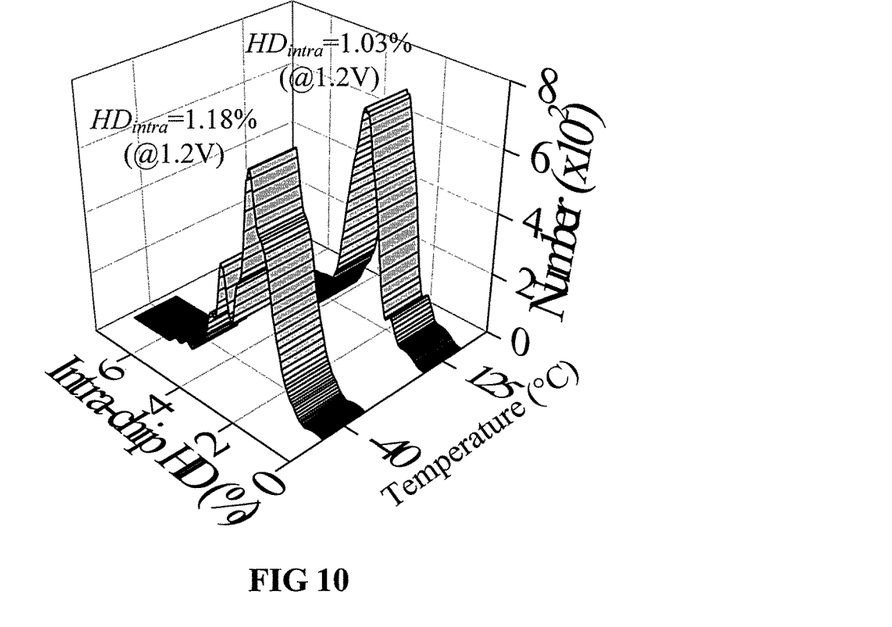
FIG. 10 shows variation curves for $HD_{intra}$ of the present invention under different temperature (−40° C., 125° C.)
Figure 11:
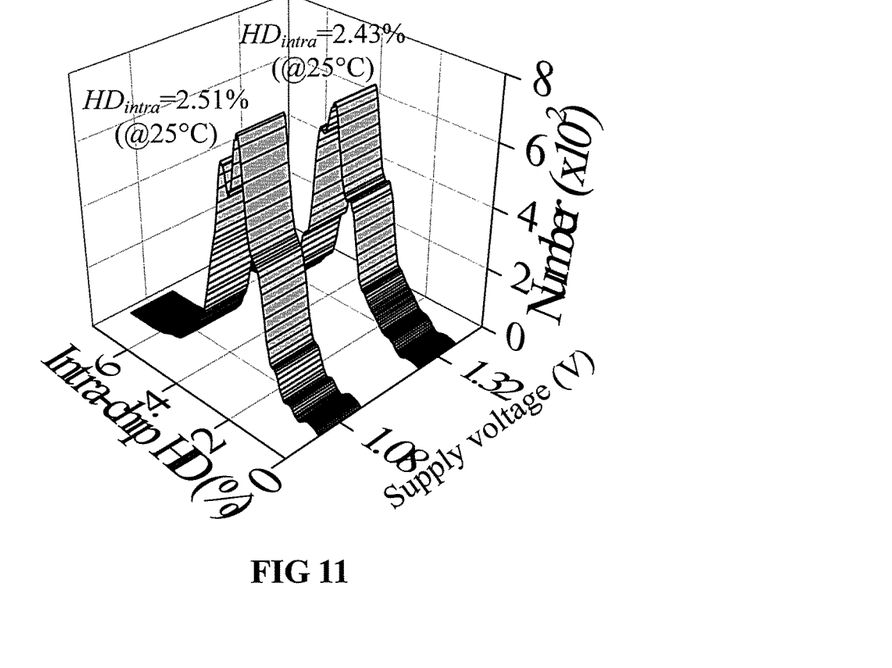
FIG. 11 shows variation curves for $HD_{intra}$ of the present invention under different voltage (1.08V, 1.32V).

As an important performance indicator of PUF circuit, reliability is used to indicate performance of PUF circuit in different working environments. Normally, it is judged through calculating intra Hamming Distance ($HD_{intra}$) of PUF circuit in different environments. Firstly, 4096 groups of challenge (random selection of 64 groups of challenge per HW) are imposed to the circuit of the present invention under 1.2V/25° C. to obtain 4096 groups of output responses with length up to 64-bit for references. After that, make the circuit work under different temperature and voltage, and impose the same challenge as that for reference responses; calculate bits of output responses as changed in corresponding to reference responses; statistical results are as shown in FIGS. 10 and 11. Reliability of the present invention is up to 98.2%.

The invention claimed is:

1. A multi-port Physical Unclonable Function (PUF) circuit based on NMOS zero temperature coefficient point, comprising: an input register, a deviation current source, an arbiter and a disturbing module;

wherein the said input register comprises m D-flip-flops; the said D-flip-flop is provided with an input terminal, an output terminal and a clock terminal, wherein m is integer; the clock terminals of the m D-flip-flops are connected which forms a first connecting terminal, and the first connecting terminal is a clock terminal of the said input register; the output terminals of the m D-flip-flops constitute m output terminals of the said input register;

wherein the said deviation current source comprises 2n deviation current modules; the said deviation current module comprises m deviation current cells; the said deviation current cell is provided with an input terminal, a zero temperature coefficient control terminal, a $1^{st}$ output terminal and a $2^{nd}$ output terminal, wherein n is integer and greater or equal to two; the input terminals of each of the m deviation current cells constitute m output terminals of the said deviation current module; a zero temperature coefficient control terminals of the m deviation current cells are connected together which forms a zero temperature coefficient control terminal of the said deviation current module; the $1^{st}$ output terminals of the m deviation current cells are connected together which forms a $1^{st}$ output terminal of the said deviation current module; the $2^{nd}$ output terminals of the m deviation current cells are connected together which forms a $2^{nd}$ output terminal of the said deviation current module;

wherein the said arbiter comprises 2n current sensitive amplifiers; each of the said current sensitive amplifier is provided with an enabling terminal, a trigger terminal, a $1^{st}$ input terminal, a $2^{nd}$ input terminal and output terminal;

wherein the said disturbing module comprises n two-input XOR gate; each of the said two-input XOR gate is provided with a $1^{st}$ input terminal, a $2^{nd}$ input terminal and output terminal;

wherein the m output terminals of the said input register are in corresponding connection with m input terminals of the 2n deviation current modules; a $1^{st}$ output terminal of the $j^{th}$ deviation current module is connected to the $1^{st}$ input terminal of the $j^{th}$ current sensitive amplifier; the $2^{nd}$ output terminal of the $j^{th}$ deviation current module is connected to the $2^{nd}$ input terminal of the $j^{th}$ current sensitive amplifier, wherein j is integer and less or equal to 2n; the output terminal of the $k^{th}$ current sensitive amplifier is connected to the $1^{st}$ input terminal of the $k^{th}$ two-input XOR gate; the output terminal of the $(n+k)^{th}$ current sensitive amplifier is connected to the $2^{nd}$ input terminal of the $k^{th}$ two-input XOR gate, wherein k is integer and less or equal to n.

2. The multi-port PUF circuit based on NMOS zero temperature coefficient point according to claim 1, wherein the said deviation current cell comprises a $1^{st}$ PMOS, a $2^{nd}$ PMOS, a $1^{st}$ NMOS and a $2^{nd}$ NMOS;

wherein a grid of the $1^{st}$ PMOS is connected to a grid of the $2^{nd}$ PMOS which forms an input terminal of the said deviation current cell;

a drain of the $1^{st}$ PMOS is connected to a drain of the $1^{st}$ NMOS; a drain of the $2^{nd}$ PMOS is connected to a drain of the $2^{nd}$ NMOS;

a grid of the 1$^{st}$ NMOS is connected to a grid of the 2$^{nd}$ NMOS which forms the zero temperature coefficient control terminal of the said deviation current cell;

a source of the 1$^{st}$ NMOS and a source of the 2$^{nd}$ NMOS are grounded;

a source of the 1$^{st}$ PMOS is the 1$^{st}$ output terminal of the said deviation current cell; and a source of the 2$^{nd}$ PMOS is the 2$^{nd}$ output terminal of the said deviation current cell.

3. The multi-port PUF circuit based on NMOS zero temperature coefficient point according to claim 1, wherein each of the said current sensitive amplifiers comprises a 3$^{rd}$ PMOS, a 4$^{th}$ PMOS, a 5$^{th}$ PMOS, a 6$^{th}$ PMOS, a 7$^{th}$ PMOS, a 3$^{rd}$ NMOS, a 4$^{th}$ NMOS, a 1-2 input NAND gate and a 2-2 input NAND gate;

wherein the 1-2 input NAND gate comprises a 1$^{st}$ input terminal, a 2$^{nd}$ input terminal and an output terminal;

wherein the 2-2 input NAND gate comprises a 1$^{st}$ input terminal, a 2$^{nd}$ input terminal and an output terminal;

wherein a grid of the 3$^{rd}$ PMOS is connected to a grid of the 6$^{th}$ PMOS which forms the trigger terminal of the said current sensitive amplifier;

a source of the 3$^{rd}$ PMOS, a source of the 4$^{th}$ PMOS, a source of the 5$^{th}$ PMOS and a source of the 6$^{th}$ PMOS are connected to a drain of the 7$^{th}$ PMOS;

a grid of the 7$^{th}$ PMOS is the enabling terminal of the said current sensitive amplifier;

a source of the 7$^{th}$ PMOS is connected to a power source;

a drain of the 3$^{rd}$ PMOS, a drain of the 4$^{th}$ PMOS, a grid of the 5$^{th}$ PMOS, a drain of the 3$^{rd}$ NMOS and a grid of the 4$^{th}$ NMOS are connected to the 1$^{st}$ input terminal of the 1-2 input NAND gate;

a drain of the 5$^{th}$ PMOS, a drain of the 6$^{th}$ PMOS, a grid of the 4$^{th}$ PMOS, a drain of the 4$^{th}$ NMOS and a grid of the 3$^{rd}$ NMOS are connected to the 2$^{nd}$ input terminal of the 2-2 input NAND gate;

a source of the 3$^{rd}$ NMOS is the 1$^{st}$ input terminal of the current sensitive amplifier;

a source of the 4$^{th}$ NMOS is the 2$^{nd}$ input terminal of the current sensitive amplifier;

the 2$^{nd}$ input terminal of the 1-2 input NAND gate is connected to the output terminal of the 2-2 input NAND gate; the 1$^{st}$ input terminal of the 2-2 input NAND gate is connected to the output terminal of the 1-2 input NAND gate which forms the output terminal of the current sensitive amplifier.

* * * * *